G. M. POWELL.
MINER'S CHECK PROTECTOR.
APPLICATION FILED DEC. 5, 1917.
1,279,155.
Patented Sept. 17, 1918.
3 SHEETS—SHEET 1.
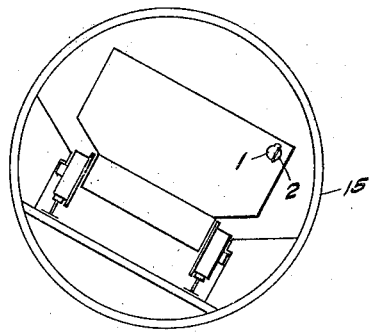
Fig. 1.
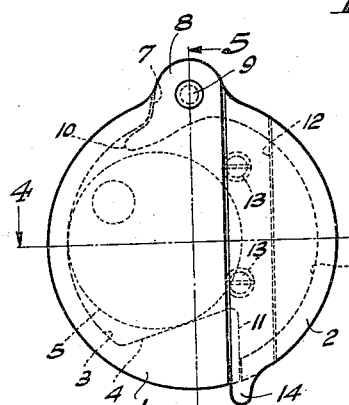
Fig. 2.
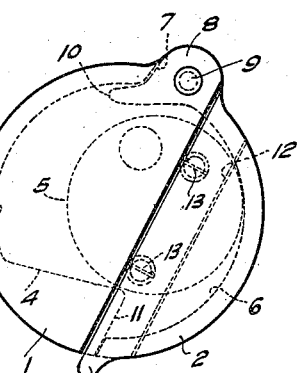
Fig. 3.
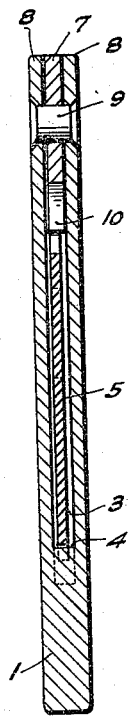
Fig. 5.
Fig. 4.
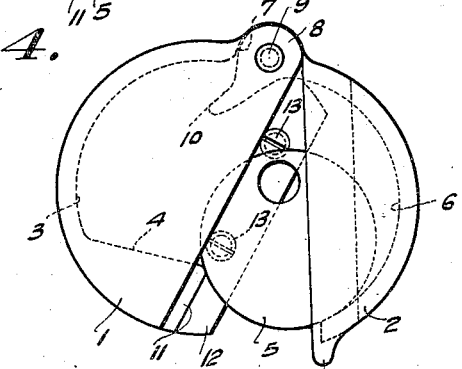
Fig. 6.
Inventor
G. M. Powell
By
Attorney

G. M. POWELL.
MINER'S CHECK PROTECTOR.
APPLICATION FILED DEC. 5, 1917.

1,279,155.

Patented Sept. 17, 1918.
3 SHEETS—SHEET 2.

Inventor
G. M. Powell

By
Attorney

G. M. POWELL.
MINER'S CHECK PROTECTOR.
APPLICATION FILED DEC. 5, 1917.

1,279,155.

Patented Sept. 17, 1918.
3 SHEETS—SHEET 3.

Inventor
G. M. Powell

By
Attorney

UNITED STATES PATENT OFFICE.

GUY M. POWELL, OF KELLERMAN, ALABAMA.

MINER'S CHECK-PROTECTOR.

1,279,155.

Specification of Letters Patent. Patented Sept. 17, 1918.

Application filed December 5, 1917. Serial No. 205,580.

*To all whom it may concern:*

Be it known that I, GUY M. POWELL, a citizen of the United States of America, residing at Kellerman, in the county of Tuscaloosa and State of Alabama, have invented certain new and useful Improvements in Miners' Check-Protectors, of which the following is a specification.

My invention relates to a device for preventing the removal or change of miners' checks or like identifying means from mine cars or like haulage means except at the proper point and by an authorized person. Heretofore the practice has been for the miner when loading a car, to hang therein or place thereon at some suitable point a check or identifying tag which was removed at the tipple where the car was weighed and dumped and credit given to the miner as identified by means of his check or tag. Where the checks were hung without the car it is obvious that it was easy for them to be readily removed, lost or exchanged for the check of some other miner than the one who loaded the car and much confusion and dissatisfaction has arisen from this source.

The object of my invention is to design a simple and inexpensive protector which will be automatic in its action and will positively prevent the removal or exchange of a check until the car on which the protector is mounted has assumed a predetermined position which it is due to assume only after arriving at the tipple or point where the check is to be removed. More specifically, my protector comprises a member fixed to the car and a movable member, the miner's check being adapted to be inserted between the two so as to form a stop which will prevent that relative movement of the members necessary for the removal of the check until the car has assumed a position different from that which it will normally assume while in the mine.

I have illustrated several embodiments of my invention in the accompanying drawings, in which:—

Figure 1 shows the preferred embodiment of my invention as applied to a car in a rotary dump and moved therewith to an abnormal or tilted position.

Figs. 2 and 3 are front elevations of the check protector in normal and abnormal positions.

Figs. 4 and 5 are sectional views taken on the lines 4—4 and 5—5 of Fig. 2.

Fig. 6 is an elevation showing the device in check discharging position.

Figure 7:
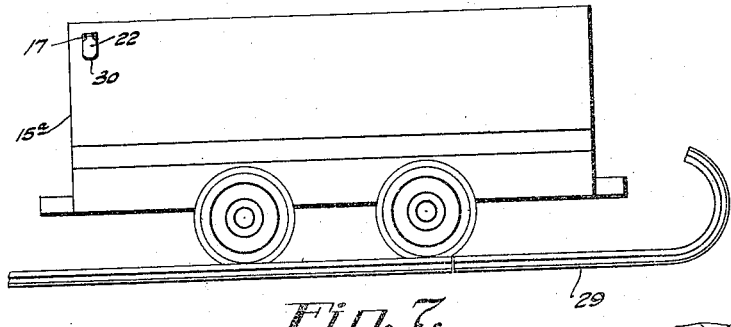

Fig. 7 shows a mine car equipped with a modified form of my protector.

Figure 8:
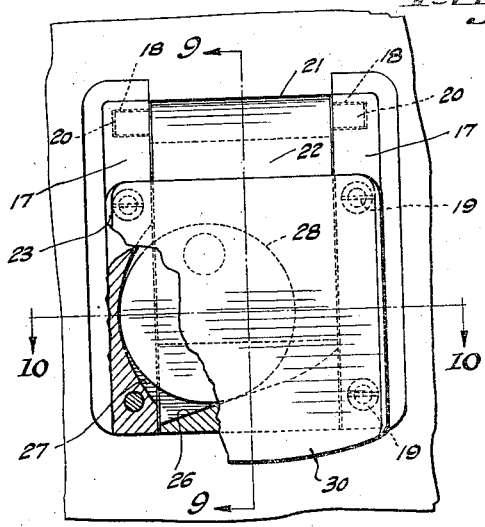

Fig. 8 is an enlarged front elevation of the protector partly broken away to show the check in locked position.

Figure 9:
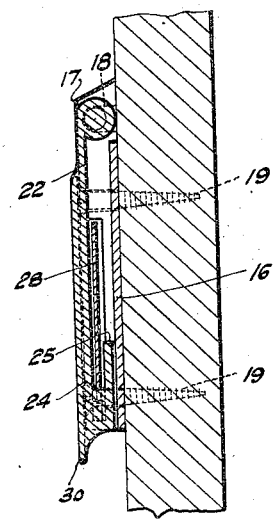
Figure 10:
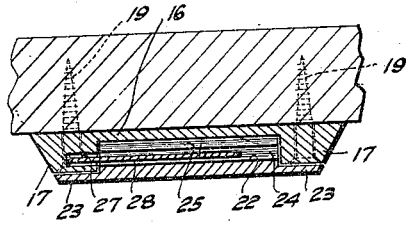

Figs. 9 and 10 are sectional views taken on the lines 9—9 and 10—10 of Fig. 8.

Figure 11:
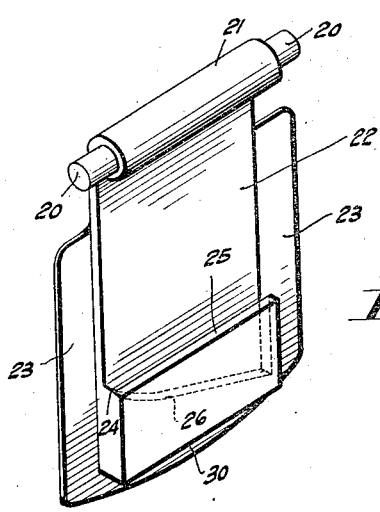

Fig. 11 is a perspective view of the check carrier.

Figure 12:
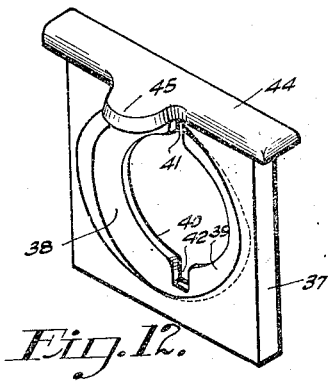
Figure 13:
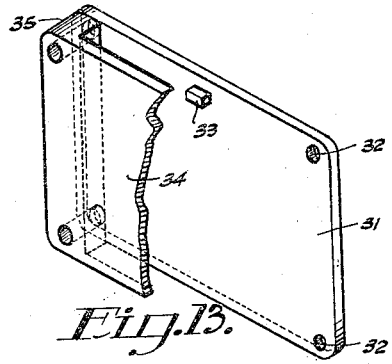

Figs. 12 and 13 are perspective views, the latter being partly broken away.

Figure 14:
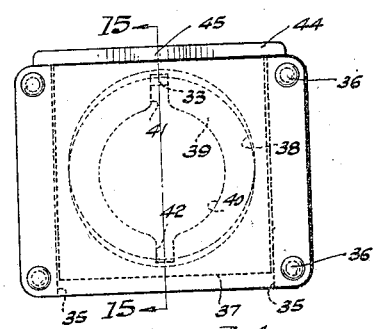

Fig. 14 presents this modified form in front elevation of a further modification of the check carrier and back plate.

Figure 15:
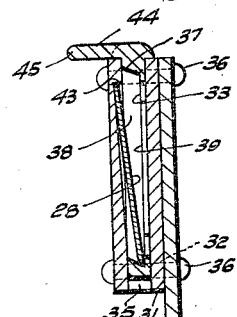

Fig. 15 is a vertical central section on the line 15—15 of Fig. 14.

Figure 16:
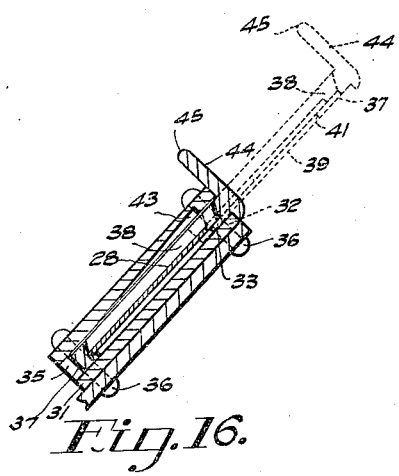

Fig. 16 shows the device tilted to its check "released" position.

Similar reference numerals refer to similar parts throughout the drawings.

In its preferred embodiment, the check holder comprises a casing which is substantially circular and composed of two segments 1 and 2, the segment 1 having a check receiving recess 3 therein opening through its straight edge, which edge in normal position is vertically disposed. The bottom 4 of this recess slopes upwardly toward this edge forming a straight inclined support for the miner's check 5 which, by reason of the inclination, is held against tendency to roll out of the pocket while the protector is in normal position, but it will be noted that the check normally projects partly from this recess, see Fig. 2. The segment 2 is provided with a recess 6 opening toward its straight edge which abuts against the straight edge of the segment 1, this recess forming a continuation of the recess 3 and receiving the projecting part of the check. The segment 2 at its upper end is provided with a hinge lug 7 adapted to be inserted between perforated ears 8 at the top of the segment 1 and to be pivotally connected thereto by a rivet or fixed pivot pin 9. The hinge lug 7 is provided with a lip 10 which extends into the upper portion of the recess 3 and has its under edge disposed substantially parallel with the inclined bottom 4 of the recess 3. The space between the tongue 10 and the bottom 4 is slightly greater than the diameter of the check 5 and the depth of the pocket is such that the check will rest therein with its diameter falling substantially to the left (Fig. 1) of a line at right angles to the bottom 4 at the point where the check rests thereon, which line will intersect the tongue near its free end. The recess 6 extends substantially below the bottom 4 to receive a tongue 11 formed on the straight edge of segment 1 below the bottom 4 and this tongue will serve to prevent any relative displacement of the segments laterally. The segment 1 has a flange 12 projecting from its rear surface along its straight edge and this flange is perforated to receive the retaining screws, bolts or rivets 13, by means of which the protector is made fast to the mine car or like carrier. The back wall of the segment 2 is correspondingly notched to receive the flange 12, it being noted that in its closed position the segment 2 protects these fastenings from interference. At the lower portion of the segment 2 I provide a finger grip 14 which projects below the curved bottom edge of the protector.

In operation, with the protector standing in its normal position, as indicated in Fig. 2, when it is desired to insert a check the miner opens out the segment 2, thrusts his check into the top of the recess 6 and closes the segment 2 against the segment 1, whereupon the check rolls down the bottom wall 4 to the position shown in dotted lines Fig. 1. Access cannot be had to the check while the protector remains in this, its normal position, by reason of the fact that the tongue 10 will engage the check and arrest the opening movement of the segment 2 before it clears the tongue 11 or opens sufficiently for the check to be engaged by an instrument and moved up the incline 4. When, however, the car reaches the dump or tipple 15 and is tilted thereby to an abnormal position, such as is indicated in Fig. 2, the bottom 4 is rocked to a reverse inclination and the check is free to roll down it as soon as the engagement of the tongue 10 therewith is released by forcing the segment 2 to its closed position. If the friction on the segment 2 holds it to the position shown in Fig. 2 as it tilts, the check will roll freely under the tongue 10 to the position shown in that figure, but normally the segment 2 will tend to swing slightly open, causing the tongue 10 to bind on the check and hold it in the pocket until released.

Referring to the embodiment of my invention illustrated in Figs. 7 to 11, I show the check protector mounted on the side of an ordinary mine car 15ª, but it will be understood that it may be mounted at any point inside or outside of the car where most convenient to be reached by the tipple operator. The protector comprises a stationary element adapted to be fixed to the car and this as shown consists of a metallic back plate 16 having along its side edges parallel raised shoulders 17 which project above the top of the plate to form bearing lugs which are provided with rearwardly opening bearing seats 18 therein. These shoulders being raised above the outer face of the plate leave between them a vertical groove or recess extending from top to bottom of the plate. Retaining screws 19 are passed through the intermediate and lower portion of these shoulders to secure the plate to the car. Before the plate is thus secured, however, the movable element of the protector is connected therewith by having its hinge pintles 20 carried by a tongue 21 inserted in the bearing seats 18 in the plate. The tongue passes with a snug fit between the bearing extensions 17 and is formed integral with the element 22 forming the check carrier and which is adapted to fit snugly between the shoulders 17 of the base plate and is provided on each side for the greater portion of its length with flanges 23 offset from the inside face of the carrier to overlap the screw bearing portion of the shoulders 17 on the base plate when the carrier is in its closed position. Near the lower end of its inner face the carrier is provided with a shoulder 24 having along the outer edge of its top a flange 25 spaced from the inner wall of the carrier so as to form a check seat, the bottom wall 26 of which slopes sharply toward a curved pocket 27 provided in one of the side shoulders 17 on the base plate. A miner's check 28 is mounted between the flange 25 on the swinging carrier 22 with its lower edge resting on the inclined face 26 and the carrier is then forced into its closed position against the back plate which brings the check into position opposite the pocket 27 into which it immediately rolls by reason of the fact that it rests on a support which slopes toward said pocket. When the check has engaged in this pocket it forms a stop or latch which will prevent the carrier being swung outwardly to release the check so long as the slope of the supporting surface 26 is not overcome by a change in position of the mine car. The check protector is so arranged on the car that this tendency of the inclined face 26 to hold the check engaged in the pocket 27 will not be overcome until the mine car has assumed a predetermined abnormal position at the tipple or dump, which abnormal position is preferably the position assumed by the car after it is dumped.

As illustrated in Fig. 7, the car is approaching the standard type of horn dump 29 and it will be apparent that as soon as the car has been tilted by the dump to discharge its contents the inclined surface 26 on which the check rests will have assumed an inclination away from the pocket 27 in the back plate, thus permitting the check to roll out of the pocket and releasing the carrier to be swung open when the check will fall into the hands of the operator. To facilitate the opening of the carrier, its lower edge projects below the base plate so as to form a finger grip 30. It will be evident that the check protector can be arranged on the end or sides of the car and with its check supporting surface inclined in the proper relation to the normal position of the car so as to prevent the check moving to unlock the carrier until the car is on the tipple or has been dumped. When the parts are assembled and locked by the check none of the fastenings that connect the two parts of the protector together or that attach the protector to the car are accessible to be tampered with.

In Figs. 12 to 16, I have illustrated a modification of my invention wherein the back plate 31 is provided at its corners with holes 32 and near the upper edge of its outer face with a stop lug 33. A front plate 34 having parallel side shoulders 35 extending vertically its full length is mounted over the plate 31 and secured by means of rivets or bolts 36 which pass through the shoulders 35 and the holes 32 into the body of the car. Before the parts 16 and 19 are secured together a movable check carrying element 37 is interposed between them, the body portion of this element being formed by a rectangular block or plate which rests with a snug sliding fit between the vertical shoulders 35 on the cover plate 34 and it is provided with a check receiving pocket 38 opening through the outer side face of the member, the pocket having a back wall 39 provided with a central opening or hole 40 therein and also having top and bottom notches 41 and 42 which are diametrically opposite in a vertical plane through, and which open into, the opening 40. These notches are adapted to receive the lug 33 as the slide 37 reaches its upper or lower position and this lug therefore serves to limit its vertical movements and prevent its detachment from the back. The pocket 38 is in the form of a cylinder having its axis at an angle of about 45° to the element 37, this arrangement producing a bottom wall which slants downwardly toward the back of the pocket and a top wall which slants upwardly away from the back of the pocket. The advantage of this will be apparent when it is observed that the check 28 will rest on the rearwardly sloping bottom face which will shift its bottom edge against the back edge of the pocket and cause it to fall by gravity outwardly so that its upper edge will enter a lock pocket 43 formed in the inside face of the cover plate 34 and, when thus engaged, it will prevent the member 37 from being lifted by means of its top 44 which projects forwardly sufficiently at its center to form a lifting lug 45 which overhangs beyond the plate 34. The check will retain this position until the car reaches its abnormal dumping or tipple position which is indicated in Fig. 16, when the tilting tendency of the sloping bottom of the pocket will be overcome and the check will fall against the back wall of the pocket and thus unlatch the movable member 37 to permit its vertical movement to check discharging position in which it will be observed that it will stand above the top edge of the car so that the finger can be passed through the hole 40 and dislodge the check. As soon as the car is righted the member 37 will drop back to position and, when the miner has loaded his car, the member 37 is drawn up, the check inserted in the pocket 38 and the member 37 is dropped back into position in the hole, whereupon the check will fall outwardly and lock the parts.

This invention is not intended to be restricted in scope to the specific embodiment shown, but contemplates such modifications as come within the spirit and scope of the claims.

Having thus described my invention, what I claim as new and desire to secure by Letters Patent, is:—

1. A miner's check protector comprising a holder adapted to be fixed to a receptacle, a guard movable relatively to the holder, opposite shoulders on the holder and guard between which the check is interposed to interlock them, and means to prevent the check shifting from interlocking position between said shoulders until the holder assumes a predetermined position.

2. A miner's check protector comprising a holder, a movable check guard connected to the holder and movable to permit the insertion of a check between it and the holder, a shoulder on the holder, and means to cause the check, when the guard is in its closed position, to shift into position relative to said shoulder to interlock said holder and guard, said check being adapted to shift out of engagement with said shoulder and unlock the guard when the holder assumes an abnormal predetermined position.

3. The combination with a mine car, of a miner's check protector mounted thereon and comprising a holder connected to the car, a movable check guard connected to the holder, the guard and holder in closed position being adapted to house a check, and means to cause the housed check to shift into position between the holder and guard to prevent the opening movement of the guard until the car assumes a predetermined abnormal position.

4. The combination in a check protector, of a check carrying element and a guard, said parts being relatively movable and adapted in closed position to house a check, and a gravity controlled check adapted in normal positions of the parts to interlock them against movement which would release the check to be removed.

5. The combination in a check protector, of a check carrying element and a guard, said parts being relatively movable and adapted in closed position to house a check, a check, and means acting by gravity on the check in the proctector to cause it, when the protector is in normal position, to move into and remain in position to interlock said parts until the protector assumes a predetermined abnormal position.

6. A check protector comprising a back plate having in its side edge a recess adapted to partly receive a miner's check and having a laterally inclined check support adapted to force a check thereon to roll into said recess, and a guard hinged to the backing plate and recessed in its edge to receive the portion of the check projecting from the backing plate, said check being adapted to interlock the guard and back plate until said check support is tilted to permit the check to shift from its "locking" position.

7. In a check protector comprising a back plate having a recess forming a pocket opening through its side wall and adapted to partly hold a check, a check guard hinged to the back plate and having a check recess in its side wall, an inclined check support in said recess in the back plate which is inclined away from said recess in the guard, a shoulder on the guard adapted to be engaged and blocked by a check when in normal position in the back plate recess to prevent the opening out of the guard, fasteners for the backing plate, and portions on said check guard which cover said fasteners when in its locked position.

8. In a check protector, a flat casing divided into segments and having a check receiving recess formed partly in both segments, one of said segments being made fast to a support for the protector and having an inclined wall at the bottom of its recess disposed to cause the check resting thereon to roll away from the other segment, the check when resting on said inclined bottom having a portion thereof projecting into the recess of the other segment, said other segment being hinged to the fixed segment and having a tongue projecting into the recess of the fixed segment into position to engage the upper edge of the check and block the opening movement of the movable segment until said check has moved to an abnormal position on said inclined bottom, substantially as described.

In testimony whereof I affix my signature.

GUY M. POWELL.

Witness:
NOMIE WELSH.